Feb. 8, 1966     D. E. SHORT     3,233,343
EDUCATIONAL MATTER
Filed Nov. 6, 1963
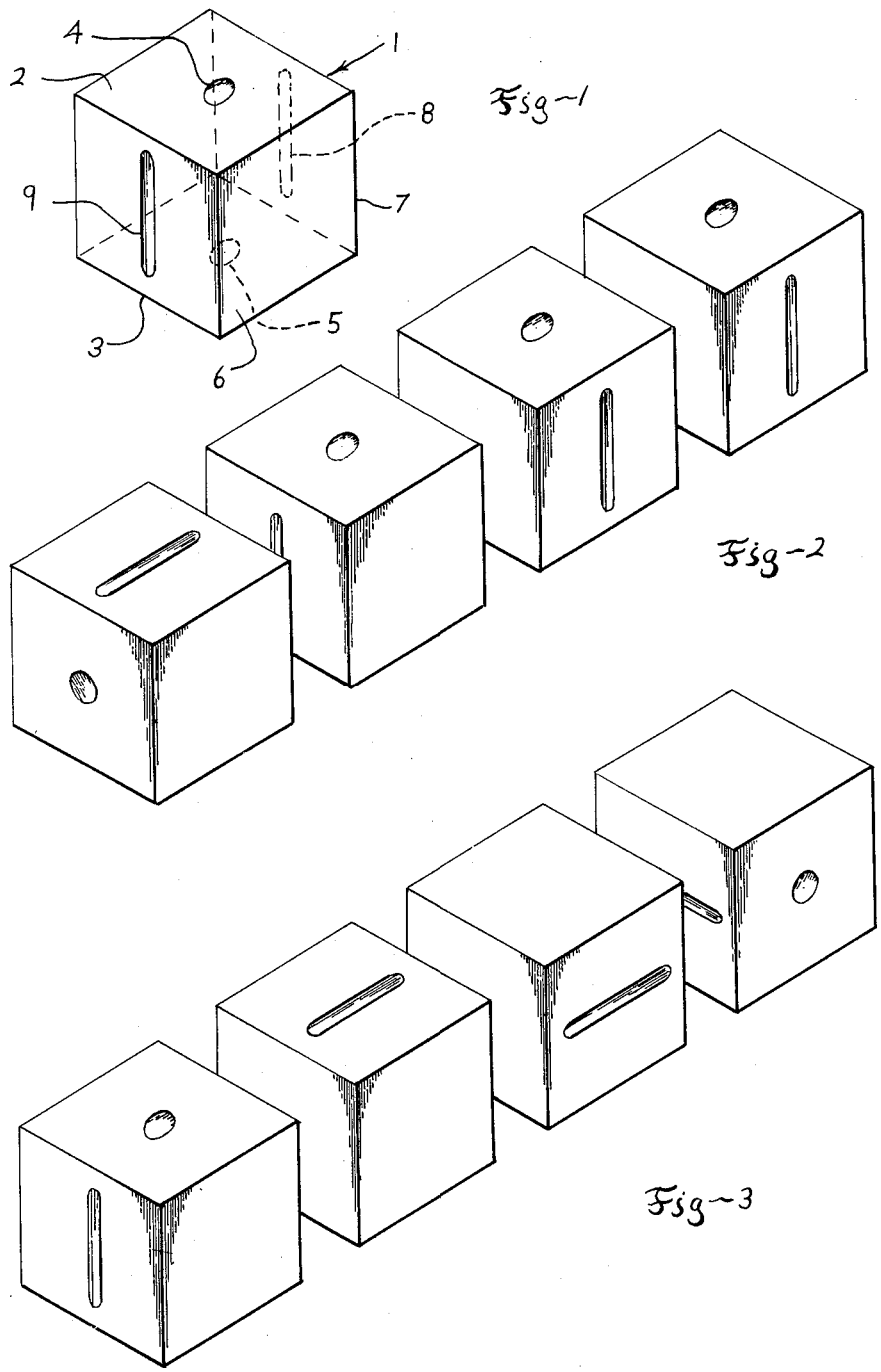
INVENTOR
David Emmett Short
BY
Synnestvedt & Lechner
ATTORNEY

United States Patent Office 3,233,343
Patented Feb. 8, 1966

3,233,343
EDUCATIONAL MATTER
David Emmett Short, R.D. 2, Box 318,
Quakertown, Pa.
Filed Nov. 6, 1963, Ser. No. 321,795
1 Claim. (Cl. 35—14)

The invention relates to means and methods for teaching or learning the Morse code.

One object of the invention is to provide means for teaching or learning the Morse code which is simple in form and reliable in operation.

Another object of the invention is to provide means for teaching or learning the Morse code which is inexpensive to manufacture.

Another object of the invention is to provide means for teaching or learning the Morse code which is characterized by ease of manipulation so that it can be used by both adults and children.

Another object of the invention is to provide a method for teaching and learning the Morse code which is visual and tends to firmly impress the symbols for the code on the mind of the person being taught.

The invention will be described below in connection with the following drawings wherein:

FIGURE 1 is a cube constructed in accordance with the invention;

FIGURE 2 is a perspective view showing several cubes arranged in a sequence with the dots and dashes appearing on the top surfaces representing symbols of the Morse code; and FIGURE 3 is a view similar to FIGURE 2, illustrating a different symbol in the Morse code.

In FIGURE 1 a cube 1 has top and bottom surfaces or faces 2 and 3 provided with small indicia or indentations 4 and 5. The indentations are circular so that they appear in the form of dots. These represent the dots of the Morse code. The faces or surfaces 6 and 7 of the cube have line-like indicia or indentations 8 and 9 which represent the dashes of the Morse code.

The invention contemplates the use of a plurality of cubes which are of the physical form described above but of different colors. Preferably four cubes are used. The preferred colors of the cubes are red, white, blue and black. The cubes are made from colored plastic. The surfaces of the indentations 4, 5, 8 and 9 are also colored, preferably different from the colors of the cubes. This is done to make the dots and dashes readily visible and for this purpose a yellow color is preferred. The cubes are about the size of dice.

In using the cubes, the same are held in the hand and then thrown on a flat surface. The cubes are then arranged along a straight line in a predetermined sequence as shown in FIGURE 2. The purpose of the different colors of the cubes is to provide for readily arranging the same in the desired sequence, for example, red, white, blue and black. The dots and dashes which appear on the top surfaces of the cubes constitute a symbol which represents a letter of the Morse code. For example, in FIGURE 3 the sequence · — (with blanks on the blue and black cubes) represents the letter A. In FIGURE 2, the sequence — · · · represents the letter B. By using four cubes of the kind mentioned, both the International and American forms of the Morse code can be taught. When teaching or learning the International version, the format of the cubes as described above is satisfactory. When teaching or learning the American version, however, at least one of the cubes is modified and the person learning must make a selection as between letters. These differences with the American system will be described below.

In the American version, the letter L is a five unit dash and the letter T is a three unit dash. Thus, when the cubes are rolled and a dash appears on the top surface of one of the blocks and with blanks on the others, the person manipulating the cubes can choose the symbol either to represent the letter L or the letter T.

The letters H, Y and Z in the American version each have four dots with different pauses between the dots. Where four dots appear, the person manipulating the cubes can choose the same to represent either the letter H, the letter Y or the letter Z.

The letter P in the American version is represented by five dots. To take care of this letter, one face of the black cube is provided with two dot-type indentations. Thus, when the cubes are rolled and the dots appear on the top surface of the red, white and blue cubes and two dots appear on the top surface of the black cube, the letter P is represneted.

I claim:

The method of teaching or learning the Morse code comprising the steps of: providing a plurality of cubes each of a different color and with each cube having a plurality of circular indicia representing dots of the Morse code, the circular indicia being colored and being disposed respectively on a plurality of faces of the cube and with each cube having a plurality of line-like indicia representing dashes of the Morse code, the line-like indicia being colored and being disposed on a plurality of different faces of the cube, said indicia being of a color different from the cube colors; and rolling the cubes on a flat surface and then arranging the cubes on the surface in a straight line according to a predetermined color sequence, the sequence of the respective indicia visible on the top surfaces of the cubes representing a symbol of the Morse code.

References Cited by the Examiner
UNITED STATES PATENTS

| | | | |
|---|---|---|---|
| 431,102 | 7/1890 | Anderson | 35—70 |
| 1,412,204 | 4/1922 | Derby | 35—71 |
| 1,428,456 | 9/1922 | Stranders | 35—71 |
| 1,539,015 | 5/1925 | Mitchell | 273—146 |
| 1,542,031 | 6/1925 | Bruhn | 35—71 |
| 1,702,760 | 2/1929 | Bradley | 35—71 |

FOREIGN PATENTS 554,900    7/1943    Great Britain.

OTHER REFERENCES

Ex parte Joseph M. Gwinn, Jr.: decision published March 5, 1957, 716 O.G. 15, pages 15–22.

EUGENE R. CAPOZIO, Primary Examiner.

HARLAND S. SKOGQUIST, Assistant Examiner.